US010680938B2

(12) United States Patent
Ravindran et al.

(10) Patent No.: US 10,680,938 B2
(45) Date of Patent: Jun. 9, 2020

(54) METHOD AND APPARATUS FOR INFORMATION CENTRIC NETWORKING (ICN) OVER LOCATOR/IDENTIFIER SEPARATOR PROTOCOL (LISP)

(71) Applicant: Futurewei Technologies, Inc., Plano, TX (US)

(72) Inventors: Ravishankar Ravindran, San Ramon, CA (US); Aytac Azgin, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 75 days.

(21) Appl. No.: 15/701,240

(22) Filed: Sep. 11, 2017

(65) Prior Publication Data

US 2019/0081890 A1 Mar. 14, 2019

(51) Int. Cl.

| | |
|---|---|
| ***H04L 12/725*** | (2013.01) |
| ***H04L 29/08*** | (2006.01) |
| ***H04L 12/749*** | (2013.01) |
| ***H04L 12/46*** | (2006.01) |

(52) U.S. Cl.

CPC ...... *H04L 45/3065* (2013.01); *H04L 12/4625* (2013.01); *H04L 12/4633* (2013.01); *H04L 45/741* (2013.01); *H04L 67/327* (2013.01); *H04L 67/2842* (2013.01); *H04L 2212/00* (2013.01)

(58) Field of Classification Search

None

See application file for complete search history.

(56) References Cited

U.S. PATENT DOCUMENTS

| | | | | |
|---|---|---|---|---|
| 2013/0227166 | A1* | 8/2013 | Ravindran | H04L 67/327 709/238 |
| 2016/0212778 | A1* | 7/2016 | Grootwassink | H04L 67/1095 |
| 2017/0005891 | A1* | 1/2017 | Liu | H04L 43/0811 |
| 2017/0373975 | A1* | 12/2017 | Moiseenko | H04L 45/748 |
| 2018/0146071 | A1* | 5/2018 | Himayat | H04L 43/16 |

OTHER PUBLICATIONS

Salsano, S., et al., "Information centric networking over SDN and OpenFlow: Architectural aspects and experiments on the OFELIA testbed", *Computer Networks*, vol. 57, Issue 16, (Nov. 13, 2013), 28 pgs.

* cited by examiner

*Primary Examiner* — Rebecca E Song

(74) *Attorney, Agent, or Firm* — Schwegman Lundberg & Woessner, P.A.

(57) ABSTRACT

A computer-implemented method of enabling information-centric networking (ICN) over a locator/identifier separation protocol (LISP) comprises receiving, by one or more processors of an ingress tunnel router (ITR), from an endpoint, an ICN interest packet that identifies an interest by name; resolving, by the one or more processors of the ITR, a target egress tunnel router (ETR) in accordance with the name; encapsulating, by the one or more processors of the ITR, the ICN interest packet in a LISP packet; and sending, by the one or more processors of the ITR, the LISP packet to the target ETR.

20 Claims, 13 Drawing Sheets

300

310

| MAPPING TABLE | | |
|---|---|---|
| EID NAME | TYPE | IP ADDRESS |
| 153.16.5.1 | IPV4 | 128.107.81.169 |
| 2001:0DB8:85A3:0000:0000:8A2E:0370:7335 | IPV6 | 128.107.81.170 |
| /DISNEY/MOVIES/CONTENTNAME | ICN | 156.97.43.84 |

METHOD AND APPARATUS FOR INFORMATION CENTRIC NETWORKING (ICN) OVER LOCATOR/IDENTIFIER SEPARATOR PROTOCOL (LISP)

TECHNICAL FIELD

The present disclosure is related to information-centric networking (ICN) and, in one particular embodiment, to ICN over the locator/identifier separation protocol (LISP).

BACKGROUND

LISP provides routing scalability by separating the identifier of an endpoint device from the locator of the endpoint device. LISP-alternative topology (LISP-ALT) is a hierarchical aggregation of endpoint identifiers (EIDs) to provide a distributed EID-to-routing locator (RLOC) mapping database. An ingress tunnel router (ITR) hosts a map cache. A map resolver (MR) may act as a first-hop LISP-ALT router. The MR has generic routing encapsulation (GRE) tunnels to other LISP-ALT routers, uses border gateway protocol (BGP) to learn paths to egress tunnel routers (ETRs), and uses path information to forward map-request (mReq) messages over LISP-ALT to ETRs.

An EID is a 32-bit (for Internet protocol (IP) version 4 (IPv4)) or 128-bit (for IP version 6 (IPv6)) value used to identify the ultimate source or destination for a LISP-encapsulated packet. A LISP header includes source and destination EIDs. A destination EID may be obtained using the domain name system (DNS). EIDs are globally unique.

A map server (MS) provides an authoritative mapping of EIDs to locations. An ETR, pre-configured with the MS using a shared secret or other authentication information, is a trusted routing destination for the EIDs mapped to it. EIDs may be mapped to multiple ETRs.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a computer-implemented method of enabling information-centric networking (ICN) over a locator/identifier separation protocol (LISP) is provided that comprises: receiving, by one or more processors of an ingress tunnel router (ITR), an ICN interest packet from an endpoint, the ICN interest packet identifying an interest by name; resolving, by the one or more processors of the ITR, a target egress tunnel router (ETR) in accordance with the name; encapsulating, by the one or more processors of the ITR, the ICN interest packet in a LISP packet; and sending, by the one or more processors of the ITR, the LISP packet to the target ETR.

Optionally, in any of the preceding aspects, the resolving of the target ETR in accordance with the name comprises: sending a request to a LISP database, the request including the name.

Optionally, in any of the preceding aspects, the resolving of the target ETR in accordance with the name further comprises: receiving a response to the request, the response identifying the target ETR; and storing, at the ITR, a mapping between the name and the target ETR.

Optionally, in any of the preceding aspects, the encapsulating of the ICN interest packet in the LISP packet comprises addressing the LISP packet to an Internet protocol (IP) address of the target ETR.

Optionally, in any of the preceding aspects, the method further comprises: receiving, by the one or more processors of the ITR, a second LISP packet addressed to the ITR; determining, by the one or more processors of the ITR, that the second LISP packet encapsulates an ICN data packet for the endpoint; and sending the ICN data packet to the endpoint.

Optionally, in any of the preceding aspects, the method further comprises: updating, by the one or more processors of the ITR, a pending interest table to map the name to the endpoint; and the determining that the second LISP packet encapsulates the ICN data packet for the endpoint comprises determining that encapsulation of the ICN data packet for the endpoint in accordance with the name and a pending interest table.

Optionally, in any of the preceding aspects, the resolving of the target ETR in accordance with the name comprises resolving a plurality of ETRs including the target ETR; and the sending of the LISP packet to the target ETR is a step in a process of sending the LISP packet to each of the plurality of ETRs.

Optionally, in any of the preceding aspects, the method further comprises: receiving, by one or more processors of a second ITR, an ICN data packet from a second endpoint, the ICN data packet including the interest name; resolving, by the one or more processors of the second ITR, a second ETR in accordance with the name included in the ICN data packet; encapsulating, by the one or more processors of the second ITR, the ICN data packet in a second LISP packet; and sending, by the one or more processors of the second ITR, the second LISP packet to the second ETR.

Optionally, in any of the preceding aspects, the method further comprises: receiving, by one or more processors of the ETR, the LISP packet from the ITR; extracting, by the one or more processors of the ETR, the ICN interest packet from the LISP packet; identifying, by the one or more processors of the ETR, data from a content store in accordance with the interest name; generating, by the one or more processors of the ETR, an ICN data packet with the data and the interest name; resolving, by the one or more processors of the ETR, a second ETR in accordance with the interest name included in the ICN data packet; encapsulating, by the one or more processors of the ETR, the ICN data packet in a second LISP packet; and sending, by the one or more processors of the ETR, the second LISP packet to the second ETR.

According to one aspect of the present invention, a router configured to enable information-centric networking (ICN) over a locator/identifier separation protocol (LISP) is provided that comprises: a memory storage comprising instructions; and one or more processors in communication with the memory storage, wherein the one or more processors execute the instructions to perform: receiving, from an endpoint, an ICN interest packet that identifies an interest by name; resolving a target egress tunnel router (ETR) in accordance with the name; encapsulating the ICN interest packet in a LISP packet; and sending the LISP packet to the target ETR.

Optionally, in any of the preceding aspects, the resolving of the target ETR in accordance with the name comprises: sending a request to a LISP database, the request including the interest name.

Optionally, in any of the preceding aspects, the resolving of the target ETR in accordance with the interest name further comprises: receiving a response to the request, the response identifying the target ETR; and storing a mapping between the interest name and the target ETR.

Optionally, in any of the preceding aspects, the encapsulating of the ICN interest packet in the LISP packet comprises addressing the LISP packet to an Internet protocol (IP) address of the target ETR.

Optionally, in any of the preceding aspects, the one or more processors further perform: receiving a second LISP packet addressed to the router; determining whether the second LISP packet encapsulates an ICN data packet for the endpoint; and in instances where the second LISP packet encapsulates the ICN data packet for the endpoint, sending the ICN data packet to the endpoint.

Optionally, in any of the preceding aspects, the one or more processors further perform updating a pending interest table to map the interest name to the endpoint; and the determining that the second LISP packet encapsulates the ICN data packet for the endpoint comprises determining that the LISP packet encapsulates the ICN data packet in accordance with the interest name and an entry in the pending interest table.

Optionally, in any of the preceding aspects, the resolving of the target ETR in accordance with the interest name comprises resolving a plurality of ETRs including the target ETR; and the sending of the LISP packet to the target ETR is a step in a process of sending the LISP packet to each of the plurality of ETRs.

Optionally, in any of the preceding aspects, the one or more processors further perform: receiving, from a second endpoint, an ICN data packet that includes the interest name; resolving a second ETR in accordance with the interest name included in the ICN data packet; encapsulating the ICN data packet in a second LISP packet; and sending the second LISP packet to the second ETR.

According to one aspect of the present invention, a non-transitory computer-readable medium storing computer instructions for enabling information-centric networking (ICN) over a locator/identifier separation protocol (LISP), is provided that when executed by one or more processors, cause the one or more processors to perform steps of: receiving, from an endpoint, an ICN interest packet that identifies an interest by name; resolving a target egress tunnel router (ETR) in accordance with the interest name; encapsulating the ICN interest packet in a LISP packet; and sending the LISP packet to the ETR.

Optionally, in any of the preceding aspects, the resolving of the target ETR in accordance with the interest name comprises: sending a request to a LISP database, the request including the interest name.

Optionally, in any of the preceding aspects, the resolving of the target ETR in accordance with the interest name comprises: receiving a response to the request, the response identifying the target ETR; and storing a mapping between the name and the target ETR.

Any one of the foregoing examples may be combined with any one or more of the other foregoing examples to create a new embodiment within the scope of the present disclosure.

BRIEF DESCRIPTION OF THE DRAWINGS

FIG. 3 is an illustration of a database schema suitable for a LISP database for use in providing ICN over LISP, according to an example embodiment.

DETAILED DESCRIPTION

Figure 1:
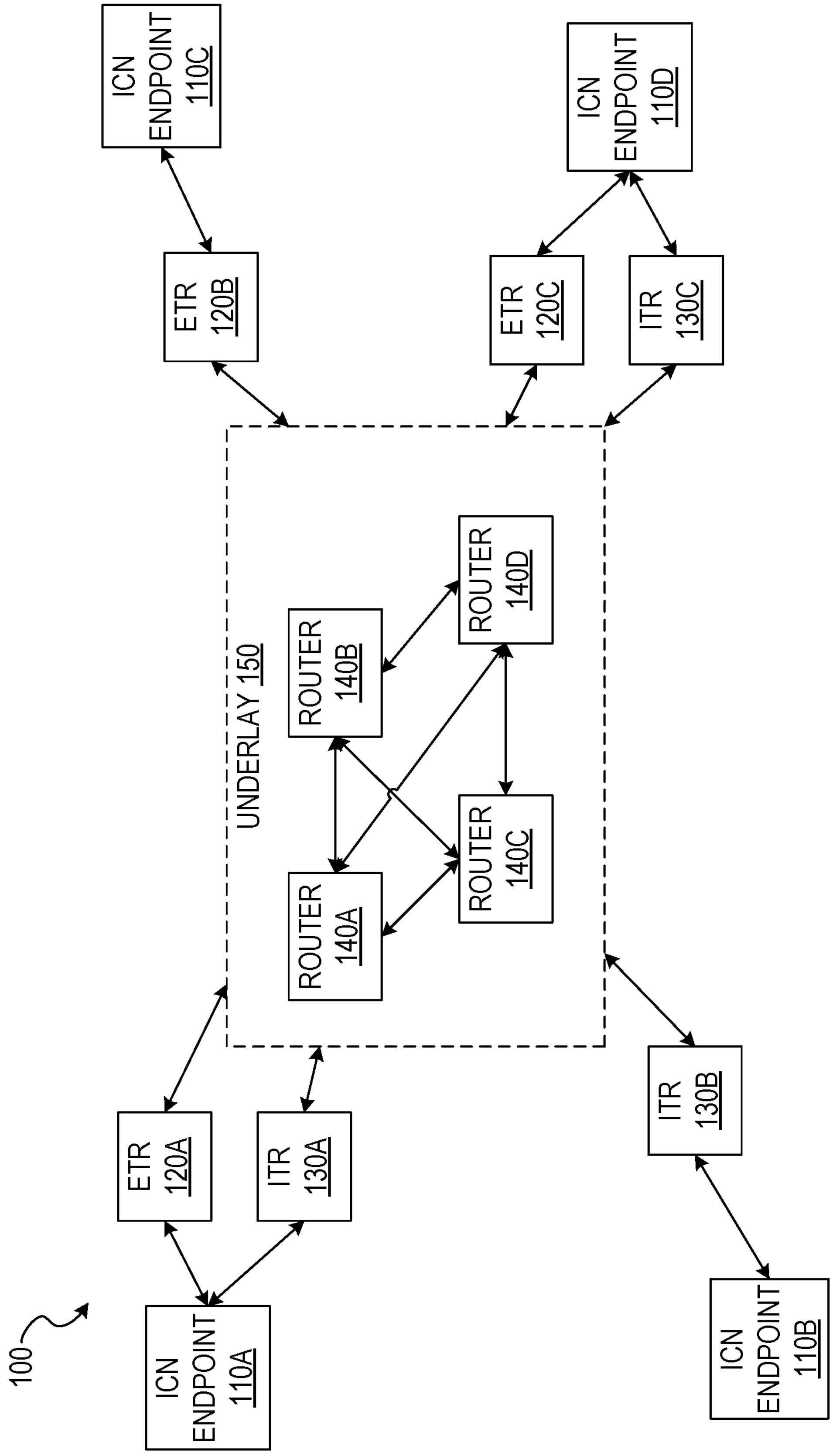
FIG. 1 is an illustration of a network topology suitable for a LISP data plane for use in providing ICN over LISP, according to an example embodiment.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, hardware, or a combination of software and hardware. The software may be in the form of computer-executable instructions stored on computer-readable media or a computer-readable storage device such as one or more non-transitory memories or other types of hardware-based storage devices, either local or networked, and may be executed on one or more of a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

In a LISP architecture, defined in Internet engineering task force (IETF) request for comments (RFC) 6830, locators and identifiers are separated. Separation of identifiers and locators allows an endpoint device to change locations without changing its identifier. When a first endpoint device changes locations, a second endpoint in communication with the first endpoint device is informed of the updated location and begins sending messages to the updated location. By contrast, in a network such as IP, if the first endpoint changes locations (and thus, its IP address), the second endpoint does not have an identifier for the first endpoint of which the network is aware. Thus, another channel is used to handle the changing of location of the first endpoint.

In LISP Alternative Logical Topology (LISP-ALT), defined in IETF RFC 6836, a distributed index system is used to allow an ITR or map resolver to find the ETR that stores the RLOCs for a particular EID. LISP-ALT may be implemented as an overlay network on the public Internet using BGP and GRE.

In ICN, data is requested by name. Request of data by name allows an interest packet (or data request) to be handled by any producer that can fulfill the interest. In existing LISP solutions, communication must be established by requesting a location for an identifier of a particular endpoint. As described herein, ICN over LISP allows an ICN consumer endpoint to request content by name, even when a LISP network connects the ICN consumer with the ICN producer of the content.

Tunnel routers (e.g., ITRs and ETRs) act as interfaces between one or more ICN networks and a LISP network. An ITR receives an ICN interest packet from an ICN consumer. The ITR identifies an ETR corresponding to the interest of the ICN interest packet using a map request message. The ITR encapsulates the ICN interest packet with a LISP header and addresses the resulting LISP packet to the identified ETR. The ETR extracts the ICN interest packet and sends it to an ICN producer capable of fulfilling the interest. Mapping of tunnel routers to ICN producers is handled through map register messages.

In response to receiving the ICN interest packet, the ICN producer sends an ICN data packet to the ITR for the ICN producer. The ITR determines that the named data in the ICN data packet matches the named interest in the ICN interest packet and looks up the originator (e.g., an ETR) of the ICN interest packet in a pending interest table (PIT). The ITR encapsulates the ICN data packet with a LISP header and addresses the resulting LISP packet to the ETR identified via the PIT. The ETR of the ICN consumer extracts the ICN data packet and sends it to the ICN consumer.

In a first example embodiment, ITRs and ETRs are modified to recognize ICN interest and ICN data packets and perform IP translation. In a second example embodiment, a LISP database is used to register and resolve ICN names Additionally, the ITRs and ETRs include PIT and caching features. In a third example embodiment, the ICN endpoints are modified to determine IP destination addresses from ICN names without modifying the ITRs and ETRs.

FIG. 1 is an illustration of a network topology 100 suitable for a LISP data plane for use in providing ICN over LISP, according to an example embodiment. The network topology 100 includes ICN endpoints 110A, 110B, 110C, and 110D, ETRs 120A, 120B, and 120C, ITRs 130A, 130B, and 130C, and routers 140A, 140B, 140C, and 140D of an underlay 150. The routers 140A-140D may be referred to collectively as routers 140 or generically as a router 140.

By way of example, a communication flow between the ICN endpoint 110A and the ICN endpoint 110D will be considered. The ICN endpoint 110A sends an ICN interest packet to the ITR 130A. The ICN interest packet includes a name of the desired content and indicates that the source of the ICN interest packet is the EID of the source ICN endpoint 110A. The ITR 130A adds a mapping to a local pending interest table (PIT) that records the EID of the ICN endpoint 110A as being interested in the named content. In this way, when an ICN data packet is received that contains the named content, the ICN data packet can be forwarded to the ICN endpoint 110A. The ETR 120A also has access to the PIT of the ITR 130A.

The ITR 130A determines that the name of the content has a mapping to the ETR 120C. In various example embodiments, discussed in more detail with respect to FIGS. 3-5 below, different methods are used of determining the destination ETR for the encapsulated ICN interest packet. The ITR 130A encapsulates the received ICN interest packet (e.g., in an outer IP packet) and addresses the encapsulating packet to the ETR 120C (e.g., to an IP address of the ETR 120C). The encapsulating packet is routed through the underlay 150 by the routers 140 to the ETR 120C. The ETR 120C extracts the encapsulated packet, determines, in accordance with the name of the content in the ICN interest packet, that the requested data is provided by the ICN endpoint 110D, and forwards the extracted packet to the ICN endpoint 110D. The ETR 120C also updates a local PIT (accessible by the ITR 130C) that indicates that future ICN data packets containing the named content should be sent to the ETR 120A.

The ICN endpoint 110D may create an ICN data packet that contains the named content and send the response packet to the ITR 130C. The ITR 130C uses the PIT to determine the destination locator (in this example, the IP address of the ETR 120A), encapsulates the response packet, and sends it to the determined locator. The encapsulating packet is routed through the underlay 150 by the routers 140 to the ETR 120A. The ETR 120A extracts the encapsulated ICN data packet, determines that the named content in the ICN data packet has an entry in the PIT for the ICN endpoint 110A, and forwards the extracted ICN data packet to the ICN endpoint 110A. Thus, the underlay 150 supports ICN applications.

If an ICN endpoint should change locations, the other endpoints do not need to be directly informed, since when the location-changing endpoint connects to a new ITR and ETR, the endpoint re-registers with the mapping server, allowing future packets addressed to the endpoint to be encapsulated and sent to the endpoint via the new ETR. This re-registration does not change the EID of the endpoint. Thus, LISP provides locator/identifier separation.

Figure 2:
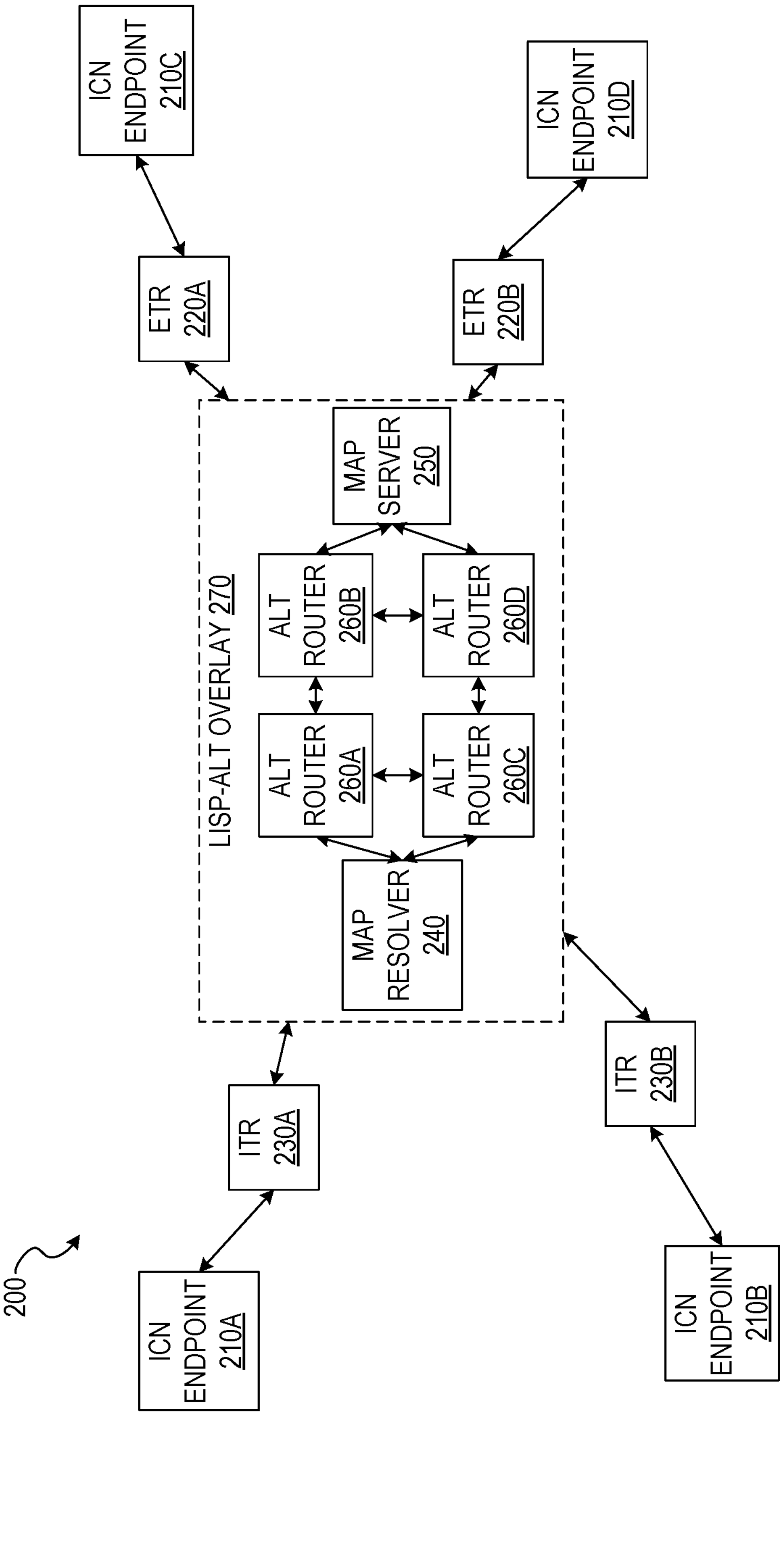
FIG. 2 is an illustration of a network topology suitable for a LISP control plane for use in providing ICN over LISP, according to an example embodiment.

FIG. 2 is an illustration of a network topology 200 suitable for a LISP control plane for use in providing ICN over LISP. The network topology 200 includes ICN endpoints 210A, 210B, 210C, and 210D, ETRs 220A and 220B, ITRs 230A and 230B, and a LISP-ALT overlay 270. The ETRs 220A and 220B may be referred to collectively as ETRs 220 or generically as an ETR 220. The LISP-ALT overlay 270 comprises a map resolver 240, a map server 250, and ALT routers 260A, 260B, 260C, and 260D. The ALT routers 260A-260D may be referred to collectively as ALT routers 260 or generically as an ALT router 260. The network topology 200 realizes the LISP control plane with LISP-ALT by way of example and not limitation, and other realizations of the LISP control plane are possible.

The ICN endpoints 210C and 210D may register their EIDs with their corresponding ETRs 220. For example, the ETR 220B may be configured by an administrator to recognize the ICN endpoint 210D as being reachable by the ETR 220B. The map server 250 may broadcast a request through the LISP-ALT overlay 270 to the ETRs 220. In response to the request, the ETRs 220 may provide the EIDs of the ICN endpoints that can be reached through them. For example, the ETR 220B may provide a response to the map server 250 that includes the EID of the ICN endpoint 210D. The response may be in the form of a Map-Register (mReg)

message that includes EID-RLOC mappings along with authentication data. The authentication data may allow the map server 250 to confirm that the EID-RLOC mappings were actually sent by the ETR 220B. In an example embodiment, the request by the map server 250 and mReg responses by the ETRs 220 are repeated periodically. In this way, changes to the ETR/EID mappings are detected by the map server 250 within a predetermined period of time.

The ALT routers 260 are connected via tunnels in an underlay network using BGP to carry reachability information for EIDs and EID-prefixes. The ALT routers 260 may be deployed in a roughly hierarchical mesh in which routers at each level in the hierarchy aggregate EID-prefixes learned from routers at lower levels and advertise the aggregated EID-prefixes to the routers at higher levels. When an ALT router 260 receives a Map-Request (mReq) message that requests an RLOC for an EID, the ALT router 260 looks up the EID in a forwarding table. The forwarding table includes a mapping of EID-prefixes to the ALT routers advertising support for those EID-prefixes. The ALT router 260 forwards the mReq to the ALT router retrieved from the forwarding table (i.e., the logical next hop on the LISP-ALT overlay 270).

The ITR 230A may send a LISP-encapsulated mReq using the user datagram protocol (UDP) to the map resolver 240 to request the RLOC for the ICN endpoint 210D. The map resolver 240 may extract the mReq and forward the mReq through the LISP-ALT overlay 270 using LISP-ALT to the map server 250. The map server 250 encapsulates the mReq with a LISP header and forwards it to the ETR 220B using UDP, in accordance with the already-received EID-RLOC mapping from the ETR 220B.

The ETR 220B may extract the mReq and respond with a Map-Reply (mRep) message to the ITR 230A. The mRep may either include the RLOC of the ETR 220B, allowing the ITR 230A to send packets to the ICN endpoint 210D via the ETR 220B, or indicate a negative response, preventing the ITR 230A from sending packets to the ICN endpoint 210D.

In an example embodiment, the EID mappings stored by the map server 250 and provided by the map resolver 240 are exclusively RLOC mappings. In these example embodiments, mappings between ICN names and EIDs are handled by the ITRs and ETRs or by the endpoints. In other example embodiments, the EID mappings stored by the map server 250 and provided by the map resolver 240 include ICN name mappings. In these example embodiments, a database schema 300 of FIG. 3, discussed below, may be used.

FIG. 3 is an illustration of a database schema 300 suitable for a LISP database for use in providing ICN over LISP, according to an example embodiment. The database schema 300 includes a mapping table 310 with a table definition 320 that indicates that each row contains an EID name, a type of the EID name, and an IP address. Rows 330, 340, and 350 contain data for the mapping table 310. Each row 330-350 indicates an IP address on the network through which the indicated EID or ICN name can be reached. For example, the IP address may be an IP address of an ETR through which another network may be accessed, with the indicated EID or ICN producer being accessible on the other network.

The row 330 indicates that a 32-bit EID 153.16.5.1 of type IPv4 is mapped to an IPv4 address of 128.107.81.169. The row 340 indicates that a 128-bit EID of type IPv6 2001:0db8:85a3:0000:0000:8a2e:0370:7335 is mapped to an IPv4 address of 128.107.81.170. The row 350 indicates that an EID of type ICN of /disney/movies/contentname is mapped to an IPv4 address of 156.97.43.84.

Thus, in contrast to existing LISP solutions, the database schema 300 supports mapping IP addresses to either IP addresses or ICN names.

Figure 4:
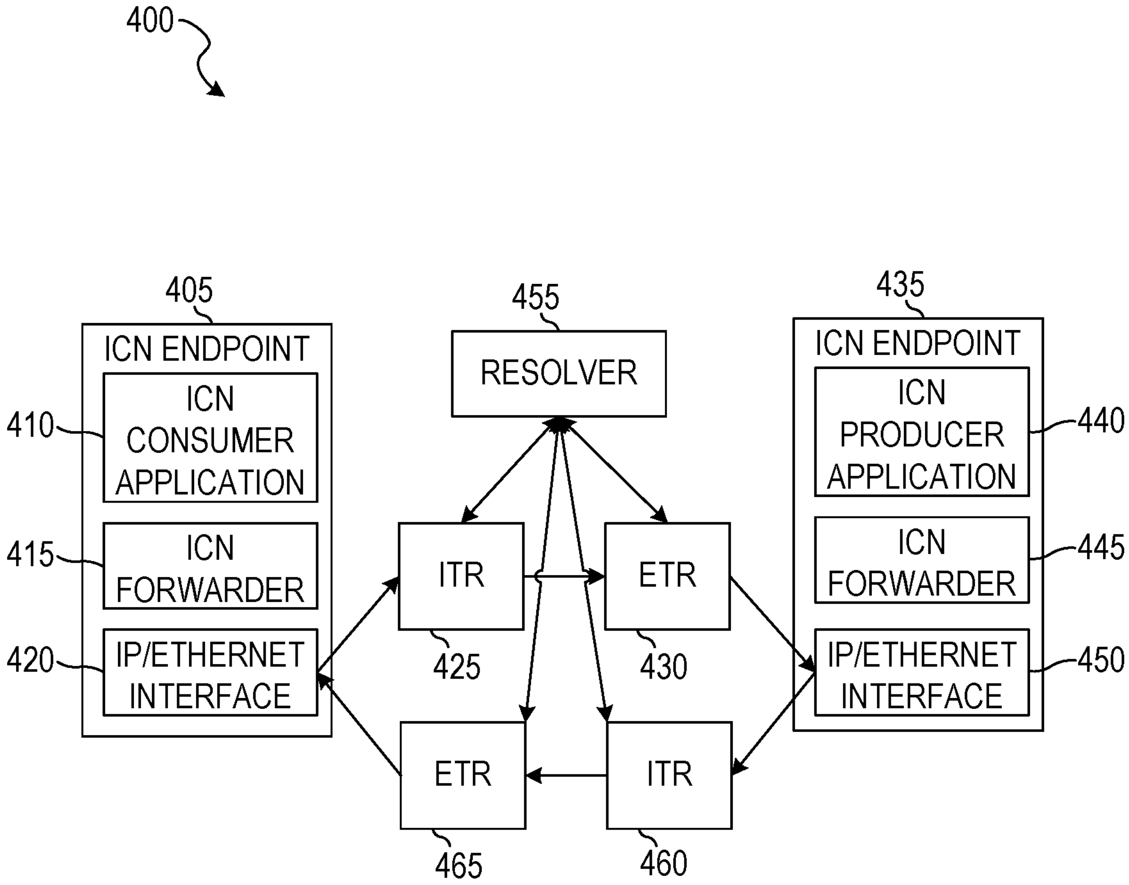
FIG. 4 is an illustration of a network topology suitable for providing ICN over LISP, according to an example embodiment.

FIG. 4 is an illustration of a network topology 400 suitable for providing ICN over LISP, according to an example embodiment. The network topology 400 includes ICN endpoints 405 and 435, ITRs 425 and 460, ETRs 430 and 465, and a resolver 455. The ICN endpoint 405 includes an ICN consumer application 410, an ICN forwarder 415, and an IP/Ethernet interface 420. The ICN endpoint 435 includes an ICN producer application 440, an ICN forwarder 445, and an IP/Ethernet interface 450. The ICN endpoint 405 is configured to use the ITR 425 as an ingress ICN gateway router and the ETR 465 as an egress ICN gateway router. The ICN endpoint 435 is configured to use the ITR 460 as an ingress ICN gateway router and the ETR 430 as an egress ICN gateway router. The example embodiment of FIG. 4 may be considered to utilize a minimal ICN state in the LISP routers. The ITRs and ETRs are ICN aware, in the sense that they identify ICN flows, encapsulate ICN packets in LISP packets, and extract ICN packets from LISP packets. Other than implementation of the resolver 455, the LISP network itself requires no modification to support the ICN traffic.

The ICN consumer application 410 sends an ICN interest packet to the ICN forwarder 415 (e.g., an interest packet for the ICN name /disney/movies/contentname). The ICN forwarder 415 determines that the next hop to resolve the name included in the ICN interest packet is via a LISP network and sends the ICN interest packet to the ITR 425 via the IP/Ethernet interface 420. The ICN interest packet indicates the EID of the ICN endpoint 405 (e.g., 153.16.5.1) and a name of the interest (e.g., /disney/movies/contentname). Thus, the ICN interest packet may be described as a packet structure of the form {IP-C, IP-I{Interest}}, wherein IP-C is a locator of the ICN endpoint 405 and IP-I is a locator of the ITR 425.

The ITR 425 receives the ICN interest packet and determines the named interest. The ITR 425 uses the resolver 455 to determine an ETR associated with the named interest. For example, a request that includes the name of the interest may be sent from the ITR 425 to the resolver 455. The resolver 455 may look up the ETR 430 in a database table that maps names to ETRs (e.g., the mapping table 310) and send one or more locators of the ETR 430 to the ITR 425. For example, the row 350 of the mapping table 310 may be used to determine that the ICN name /disney/movies/contentname maps to the IP address 156.97.43.84.

The ITR 425 sends a LISP data packet to the determined ETR (e.g., the ETR having IP address 156.97.43.84) that encapsulates the interest packet. Thus, the LISP data packet sent from the ITR 425 to the ETR 430 may be described as a packet structure of the form {IP-I, IP-E{LISP{P-C, IP-I {Interest}}}, wherein IP-E is a locator of the ETR 430 (e.g., 156.97.43.84).

The ETR 430 receives the LISP data packet, extracts the embedded ICN interest packet, and determines the interest named in the ICN interest packet (e.g., /disney/movies/contentname). Using a local name table that maps interest names to IP addresses of ICN producers, the ETR 430 identifies the ICN endpoint 435 as a producer of the identified interest, and forwards the ICN interest packet to the ICN endpoint 435. The ICN interest packet received by the ICN endpoint 435 may be described as a packet structure of the form {IP-C, IP-P{Interest}}, where IP-P is an EID of the ICN endpoint 435. The ICN forwarder 445 of the ICN endpoint 435 receives the ICN interest packet via the IP/Ethernet interface 450. The ICN forwarder 445 determines that the ICN producer application 440 is the producing application for the named interest (e.g., using a local mapping table) and provides the ICN interest packet to the ICN producer application 440.

The ICN producer application 440 responds to the ICN interest packet with an ICN data packet that satisfies the interest. The ICN data packet may be described as a data structure of the form {IP-P, IP-C{Data}}. The ICN data packet is received by the ICN forwarder 445, which forwards the ICN data packet to the ITR 460 via the IP/Ethernet interface 450. The ITR 460 performs a lookup on IP-C (e.g., 153.16.5.1) to determine an IP address for the ETR 465 (e.g., 128.107.81.169, as indicated by the row 330 of FIG. 3). Thus, the ITR 460 may encapsulate the ICN data packet in a LISP packet of the packet structure {IP-E, IP-I{LISP{IP-P, IP-C{Data}}}}. The LISP packet is sent to the ETR 465, which extracts the embedded ICN data packet and forwards it to the ICN endpoint 405. The ICN data packet received by the ICN endpoint 405 may be described as a packet structure of the form {IP-I, IP-C{Data}}. Within the ICN endpoint 405, the ICN forwarder 415 receives the ICN data packet via the IP/Ethernet interface 420, determines that the ICN consumer application 410 is the requester of the data (e.g., via a local mapping table), and provides the ICN data packet to the ICN consumer application 410.

Figure 5:
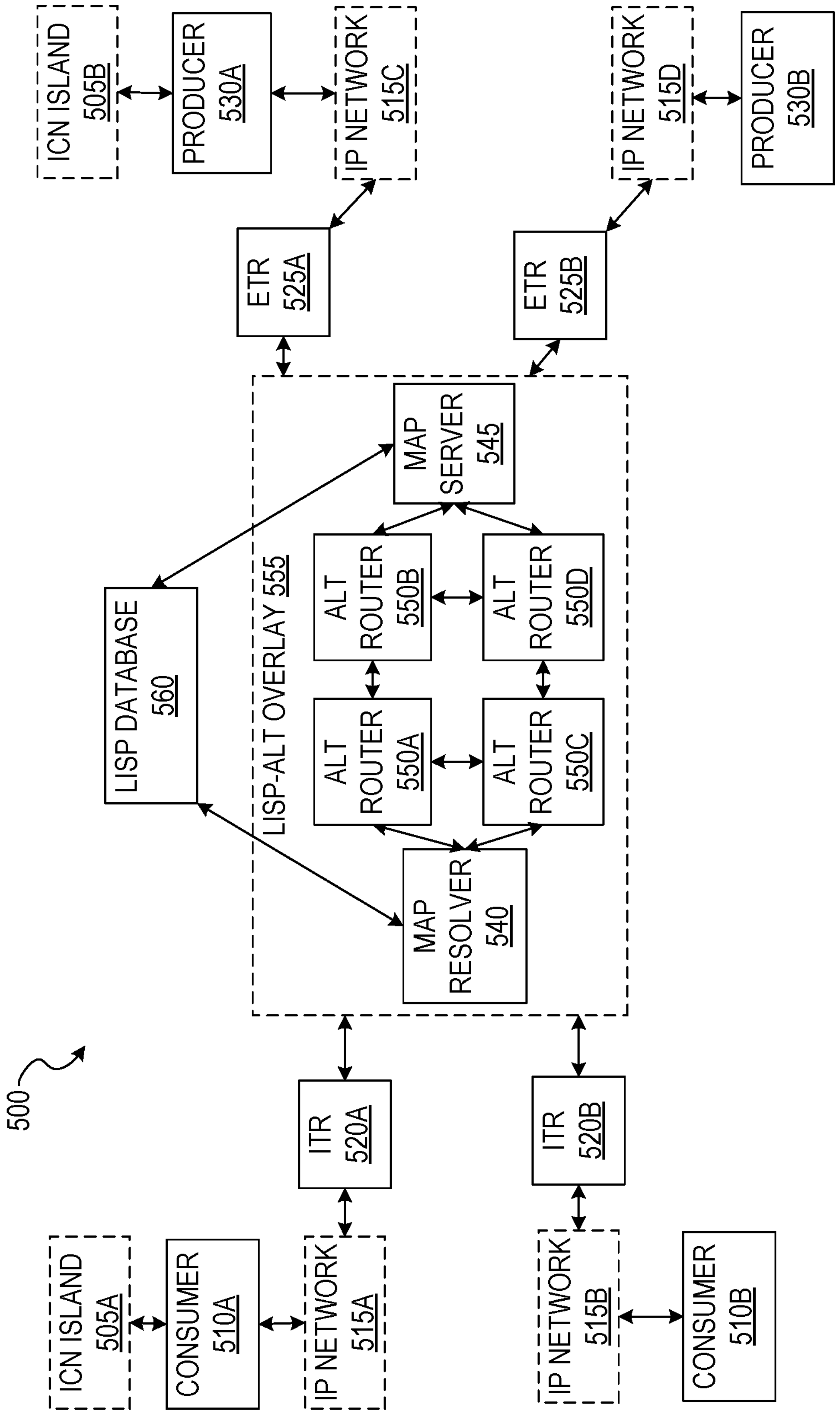
FIG. 5 is an illustration of a network topology suitable for providing ICN over LISP, according to an example embodiment.

FIG. 5 is an illustration of a network topology 500 suitable for providing ICN over LISP, according to an example embodiment. The network topology 500 includes ICN islands 505A and 505B, ICN consumer endpoints 510A and 510B, IP networks 515A, 515B, 515C, and 515D, ITRs 520A and 520B, ETRs 525A and 525B, ICN producer endpoints 530A and 530B, a LISP-ALT overlay 555, and a LISP database 560. The LISP-ALT overlay 555 includes a map resolver 540, a map server 545, and ALT routers 550A, 550B, 550C, and 550D. The ICN islands 505A-505B may be referred to collectively as ICN islands 505 or generically as an ICN island 505. The IP networks 515A-515D may be referred to collectively as IP networks 515 or generically as an IP network 515. The ETRs 525A-525B may be referred to collectively as ETRs 525 or generically as an ETR 525. The ICN producer endpoints 530A-530B may be referred to collectively as ICN producer endpoints 530 or generically as an ICN producer endpoint 530. The ALT routers 550A-550D may be referred to collectively as ALT routers 550 or generically as an ALT router 550.

The example embodiment of FIG. 5 may be considered to utilize a minimal ICN state in the LISP routers. In this example embodiment, the ICN hosts are not modified, and thus may be unaware that the ICN traffic is routed via the underlay 150. The ITRs and ETRs are ICN aware, in the sense that they identify ICN flows, encapsulate ICN packets in LISP packets, and extract ICN packets from LISP packets. Other than modification of the map resolver 540 and map server 545, the LISP network itself requires no modification to support the ICN traffic.

The LISP-ALT overlay 555 provides a separate, virtual network on which packets using EIDs instead of IP addresses may be routed. The LISP-ALT overlay 555 is an overlay on an IP network (e.g., the public Internet) in which the ALT routers 550 are connected using tunnels through the IP network. The LISP-ALT overlay 555 routes packets via the ALT routers 550 to destinations in accordance with identifier/location mappings stored by the map resolver 540 and requested from the map server 545.

The LISP database 560 is utilized by the LISP-ALT overlay 555 to determine one or more ETRs associated with an interest. For example, a request may be sent from the map resolver 540 or the map server 545 to the LISP database 560 that identifies an interest. In response to the request, the LISP database 560 may identify an ETR through which an ICN producer can be reached that can satisfy the interest. In an example embodiment, the LISP database 560 uses the database schema 300 of FIG. 3.

The ICN consumer endpoints 510A and 510B are connected to the ITRs 520A and 520B via the IP networks 515A and 515B. Similarly, the ICN producer endpoints 530A and 530B are connected to the ETRs 525A and 525B via the IP networks 515C and 515D. Each ICN island 505 comprises a set of ICN endpoints communicating using ICN.

The ICN producer endpoints 530A and 530B register their respective content with the ETRs 525A and 525B. For example, an ICN producer endpoint may register a name prefix (e.g., "/Producer1") to register the ICN producer endpoint as a source for all content having a name that begins with the name prefix. Each ETR 525 maintains a mapping of the registered content with the IP address of the registering producer endpoint 530. The ETRs 525 send mReg messages to the map server 545 for their mappings. The mReg messages identify the content that can be reached via an IP address of the registering ETR 525. The map server 545 maintains a mapping of the content available at each ETR 525 to the IP address of the ETR 525 through which the content can be reached. In this way, a request for content made to the map server 545 may yield an IP address of an ETR 525. A request for the content from the identified ETR 525 can be forwarded through the corresponding IP network 515 to the correct producer endpoint 530.

By way of example, consider an ICN interest packet sent from the ICN consumer endpoint 510A to the ITR 520A, requesting content provided by the ICN producer endpoint 530A. The ITR 520A sends an mReq message to the map resolver 540 that identifies the content. The map resolver 540, through communication with the map server 545, identifies the ETR 525A as the egress router through which the content of interest can be accessed. The ITR 520A encapsulates the ICN interest packet in LISP-IP as {IP-ETR1{ICN-Interest}}, where IP-ETR1 is the IP address of the ETR 525A, and forwards the LISP-IP packet over a tunnel in the underlay 150 to the ETR 525A.

The ETR 525A extracts the encapsulated ICN interest packet and re-encapsulates it as {IP-PRODUCER1{ICN-Interest}}, where IP-PRODUCER1 is the IP address of the ICN producer endpoint 530A on the IP network 515C. The encapsulated packet is forwarded to the ICN producer endpoint 530A via the IP network 515C. At this point, the ICN producer endpoint 530A can respond to the ICN interest packet with an ICN data packet, which follows the reverse route through the IP network 515C, the ETR 525A, the LISP-ALT overlay 555, the ITR 520A, and the IP network 515A to the requesting ICN consumer endpoint 510A. The data flow process is discussed in additional detail with respect to FIG. 5, below.

In an example embodiment, an ICN producer endpoint may register with multiple ETRs. For example, the ICN producer endpoint 530A could register with both the ETR 525A and the ETR 525B. In this example, both ETRs 525 would send mReg messages to the map server 545. The map resolver 540 may respond to an mReq message with an ETR candidate list that includes the IP addresses of multiple ETRs. Thus, an ITR may send an encapsulated interest packet to the identified ETRs sequentially (e.g., to a first ETR and then to a second ETR if a predetermined period of time elapses without receiving a responsive data packet) or in parallel (e.g., by sending a packet to each ETR in the ETR candidate list without waiting for a response).

Figure 6:
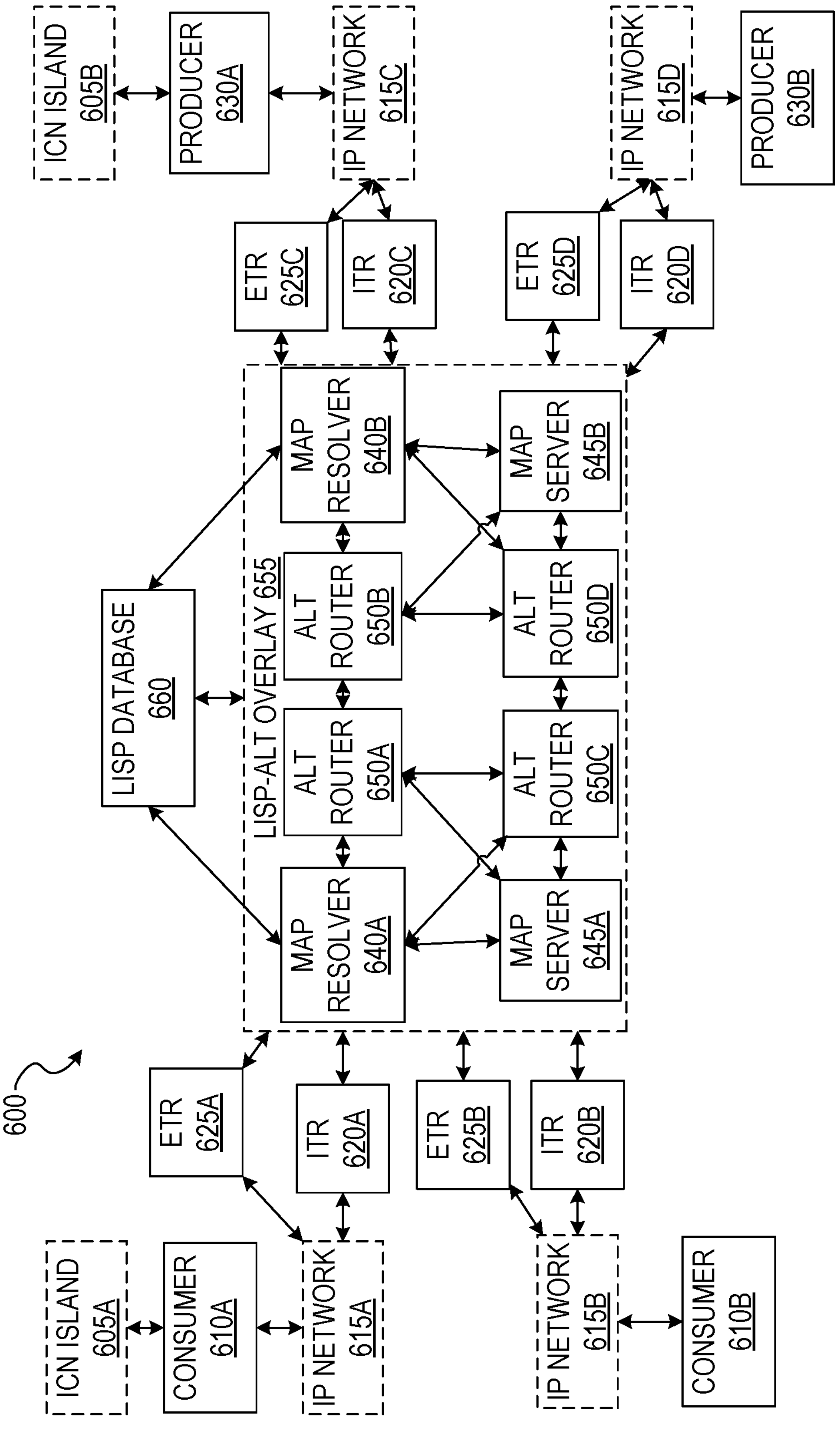
FIG. 6 is an illustration of a network topology suitable for providing ICN over LISP, according to an example embodiment.

FIG. 6 is an illustration of a network topology 600 suitable for providing ICN over LISP, according to an example embodiment. The network topology 600 includes ICN islands 605A and 605B, consumer endpoints 610A and 610B, IP networks 615A, 615B, 615C, and 615D, ITRs 620A, 620B, 620C, and 620D, ETRs 625A, 625B, 625C, and 625D, producer endpoints 630A and 630B, a LISP-ALT overlay 655, and a LISP database 660. The LISP-ALT overlay 655 includes map resolvers 640A and 640B, map servers 645A and 645B, and ALT routers 650A, 650B, 650C, and 650D. The example embodiment of FIG. 6 utilizes an explicit PIT and content store (CS) state in the LISP routers. In this example embodiment, the ICN hosts are not modified, and thus may be unaware that the ICN traffic is routed via the underlay 150. The ITRs and ETRs are ICN aware, in the sense that they identify ICN flows, encapsulate ICN packets in LISP packets, and extract ICN packets from LISP packets.

In an example embodiment, a single router serves as both an ITR and an ETR. For example, the ITR 620A and the ETR 625A may be a single machine. Likewise, in an example embodiment, a single server serves as both a map server and a map resolver. For example, the map server 645A and the map resolver 640A may be a single machine.

A producer (e.g., the producer endpoint 630A) responding to an ICN interest packet creates an ICN data packet and encapsulates it within an IP packet addressed to the ITR of the producer (e.g., the ITR 620C).

The ITR 620C determines an RLOC (e.g., an IP address) to forward the received ICN data packet using a PIT or by sending an mReq message to the map resolver 640A or 640B. The ITR 620C encapsulates the ICN data packet in LISP-IP, addressed to the ETR 625A, and forwards the encapsulated packet over the underlay 150 to the ETR 625A.

The ETR 625A extracts the ICN data packet and re-encapsulates it in an IP packet addressed to the consumer indicated in the ICN data packet (e.g., the ICN consumer endpoint 610A). The ICN consumer receives the IP packet, extracts the ICN data packet, and accesses the data provided by the producer.

The ETR 625A may also store the data in the ICN data packet in a CS accessible by the ITR 620A. The CS stores the data along with the name of the interest to which the data is responsive. Later ICN interest packets sent to the ITR 620A with the same named interest may be satisfied directly by the ITR 620A by retrieving the cached data from the CS and providing it in an ICN data packet in response to the ICN interest packet. In this way, the CS allows for faster responses and reduced network usage.

Figure 7:
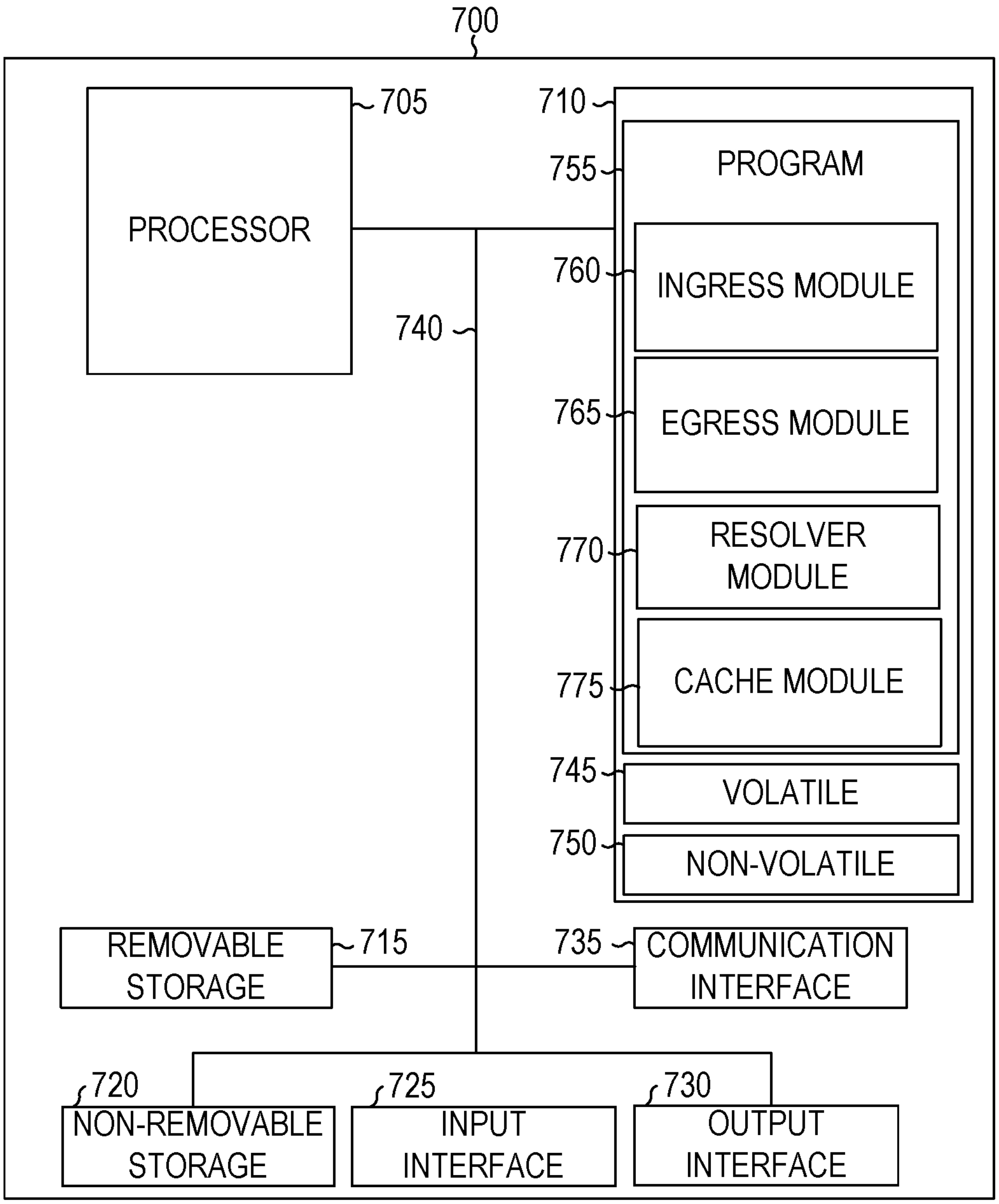
FIG. 7 is a block diagram illustrating circuitry for implementing algorithms and performing methods, according to an example embodiment.

FIG. 7 is a block diagram illustrating circuitry for implementing algorithms and performing methods, according to example embodiments. All components need not be used in various embodiments. For example, clients, servers, autonomous systems, and cloud-based network resources may each use a different set of components, or, in the case of servers for example, larger storage devices.

One example computing device in the form of a computer 700 (also referred to as a computing device 700 and a computer system 700) may include a processor 705, memory storage 710, removable storage 715, and non-removable storage 720, all connected by a bus 740. Although the example computing device is illustrated and described as the computer 700, the computing device may be in different forms in different embodiments. For example, the computing device may instead be a smartphone, a tablet, a smartwatch, or another computing device including elements the same as or similar to those illustrated and described with regard to FIG. 7. Devices such as smartphones, tablets, and smartwatches are generally collectively referred to as "mobile devices" or "user equipment." Further, although the various data storage elements are illustrated as part of the computer 700, the storage may also or alternatively include cloud-based storage accessible via a network, such as the Internet, or server-based storage.

The memory storage 710 may include volatile memory 745 and non-volatile memory 750, and may store a program 755. The computer 700 may include—or have access to a computing environment that includes—a variety of computer-readable media, such as the volatile memory 745, the non-volatile memory 750, the removable storage 715, and the non-removable storage 720. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 700 may include or have access to a computing environment that includes an input interface 725, an output interface 730, and a communication interface 735. The output interface 730 may interface to or include a display device, such as a touchscreen, that also may serve as an input device. The input interface 725 may interface to or include one or more of a touchscreen, a touchpad, a mouse, a keyboard, a camera, one or more device-specific buttons, one or more sensors integrated within or coupled via wired or wireless data connections to the computer 700, and other input devices. The computer 700 may operate in a networked environment using the communication interface 735 to connect to one or more remote computers, such as database servers. The remote computer may include a personal computer (PC), server, router, network PC, peer device or other common network node, or the like. The communication interface 735 may connect to a local-area network (LAN), a wide-area network (WAN), a cellular network, a WiFi network, a Bluetooth network, or other networks.

Computer-readable instructions stored on a computer-readable medium (e.g., the program 755 stored in the memory storage 710) are executable by the processor 705 of the computer 700. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 755 is shown as including an ingress module 760, an egress module 765, a resolver module 770, and a cache module 775. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The ingress module 760 may be implemented on an ITR to receive data packets from one or more endpoints via a first network, encapsulate the data packets for transmission over a second network, and send each data packet to an ETR on the second network for delivery to an endpoint connected to the ETR via a third network. The network protocols of the three networks may be the same or different, in various example embodiments. For example, the first network and the third network may be ICNs and the second network may be an IP network. The ingress module 760 may maintain a database that maps identifiers on the first network to locations. Entries in the database may be added or updated in response to receiving a data packet or registration message that indicates both a source location (e.g., IP address) and a source identifier from the identified endpoint.

The egress module 765 may be implemented on an ETR to receive encapsulated data packets from an ITR over a first network, extract the encapsulated data packets, and send each extracted data packet to an endpoint connected to the ETR via a second network. The network protocols of the two networks may be the same or different, in various example embodiments. For example, the first network may be an IP network and the second network may be an ICN. The egress module 765 may maintain a database that maps identifiers on the second network to locations. Entries in the database may be added or updated in response to receiving a data packet or registration message that indicates both a location (e.g., IP address) and an identifier for an endpoint.

The resolver module 770 may be implemented on an ITR, an ETR, a map resolver, or a map server. The resolver module 770 receives a request for a locator to which packets for an identifier can be routed and responds to the request with the locator. For example, an ITR may receive a data packet on a first network that is addressed to an identifier of an endpoint on a third network that can be reached via an ETR on a second network. The ITR may request a locator of the ETR and the resolver module 770 may handle the request.

The cache module 775 of an ITR or an ETR may cache results received from the resolver module 770. Thus, when a series of packets is received by an ITR or an ETR, only one request to the resolver module 770 is needed; additional lookups for locators corresponding to identifiers can be retrieved using the cache module 775.

Figure 8:
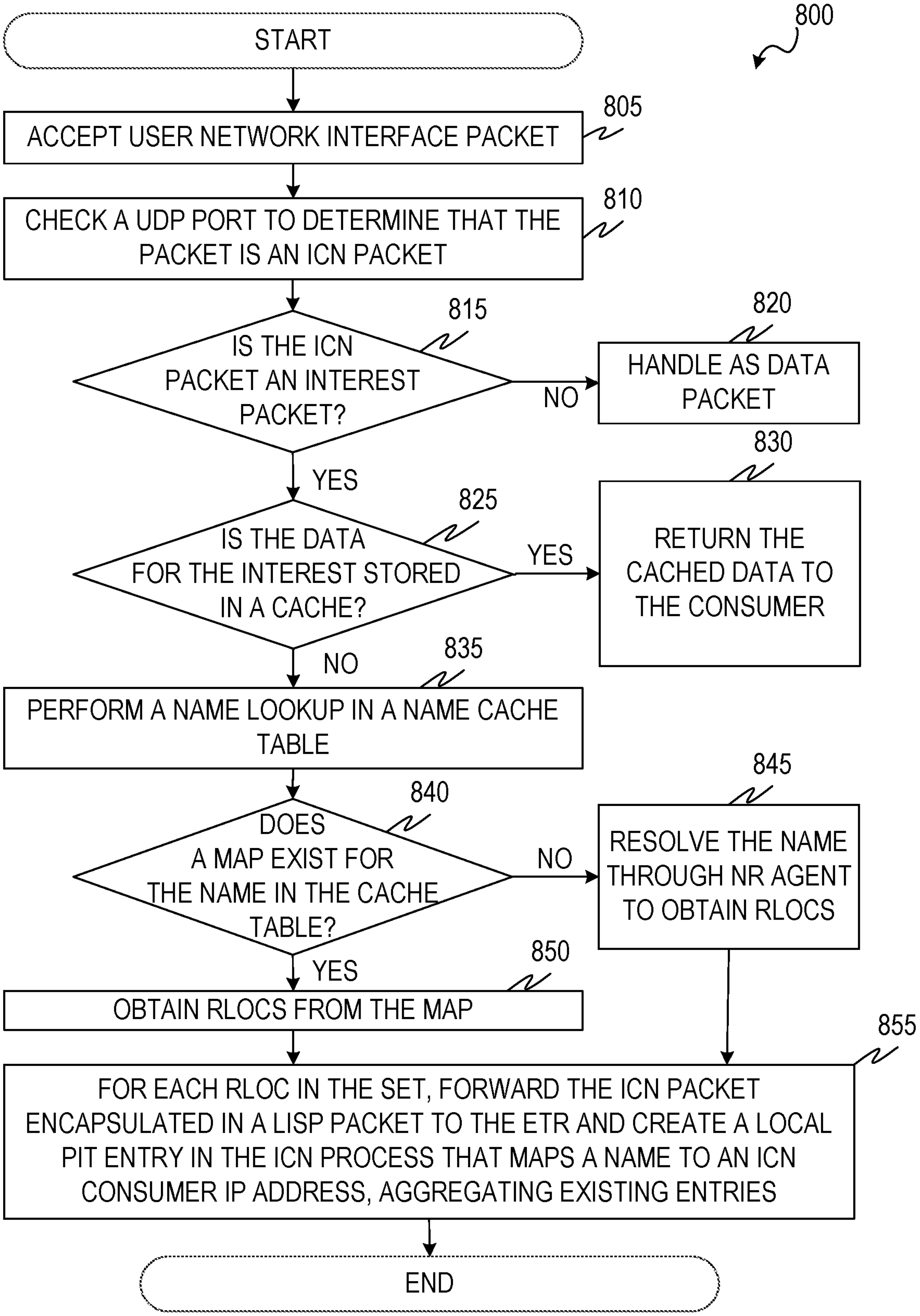
FIG. 8 is a flowchart illustration of a method of providing ICN over LISP, according to an example embodiment.

FIG. 8 is a flowchart illustration of a method 800 of providing ICN over LISP, according to an example embodiment. The method 800 includes operations 805, 810, 815, 820, 825, 830, 835, 840, 845, 850, and 855. By way of example and not limitation, the method 800 is described as being performed by elements of the network topology 100, described above with respect to FIG. 1, and the computer 700, described above with respect to FIG. 7.

In operation 805, the ingress module 760 of the ITR 130A accepts a user network interface (UNI) packet. A UNI packet is a data packet received via an endpoint-facing interface. For example, an ICN endpoint on a first network may connect to an ITR via a UNI of the ITR and send an ICN data packet to an ICN endpoint on a second network via the ITR.

In operation 810, the ingress module 760 determines if the UNI packet is an ICN packet by checking a UDP port value of the UNI packet. For example, a database table may contain records for LISP services and their corresponding UDP ports. If the UDP port of the UNI packet matches a port of a LISP service, the ingress module 760 may determine that the UNI packet is an ICN packet. If the UNI packet is not an ICN packet, the method 800 terminates and the UNI packet is treated as an ordinary LISP packet instead of an ICN packet. If the UNI packet is a LISP-encapsulated ICN packet, the ingress module 760 extracts the ICN packet from the encapsulating LISP packet. In other example embodiments, the ITR may determine that the received data packet is an ICN data packet in accordance with the port on which the data packet was received, the network interface on which the data packet was received, or any suitable combination thereof.

In operation 815, the ingress module 760 determines if the ICN packet is an ICN interest packet. For example, the ingress module 760 may examine a header of the ICN packet to determine if the message type of the ICN packet indicates that the ICN packet is an ICN interest packet. If the ICN packet is not an ICN interest packet, then in operation 820, execution is transferred to operation 1050 of the method 1000, described below, and the method 800 terminates. However, if the ICN packet is an ICN interest packet, the method 800 continues with operation 825.

In operation 825, the ingress module 760 identifies the interest of the ICN interest packet (e.g., from an ICN interest message field of the ICN interest packet) and determines, via the cache module 775, if data for the interest is available in the cache. If the data is available in the cache, the cache module 775 retrieves the cached data and the ingress module 760 provides, in operation 830, the data to the requesting consumer endpoint in an ICN data packet. The ICN data packet may be addressed to an IP address of the consumer endpoint. Provision of the ICN data packet to the consumer endpoint terminates the method 800. If the data is not available in the cache, the method 800 continues with operation 835.

In operation 835, the ingress module 760 performs a name lookup for the name of the interest in a name cache table, using the cache module 775. If a map exists for the name in the cache table (operation 840), the ingress module 760 obtains a set of RLOCs from the map (operation 850).

Otherwise, the ingress module 760 resolves the name through map resolver 555 to obtain the set of RLOCs (operation 845). For example, the ingress module 760 may communicate with a map resolver via a network to request an RLOC for the named interest. The cache module 775 may update the cache table to store a mapping between the named interest and the received RLOC (e.g., a locator of an ETR).

In operation 855, the ingress module 760 encapsulates the ICN interest packet in a LISP packet and forwards the LISP packet to each RLOC in the set of RLOCs. The ingress module 760 also creates a local pending interest table (PIT) entry that maps the name of the interest to the ICN consumer IP address, aggregating existing similar entries. By use of the PIT, the ITR 130A will be able to forward a later-received ICN data packet that satisfies the interest to the ICN consumer that requested it.

Figure 9:
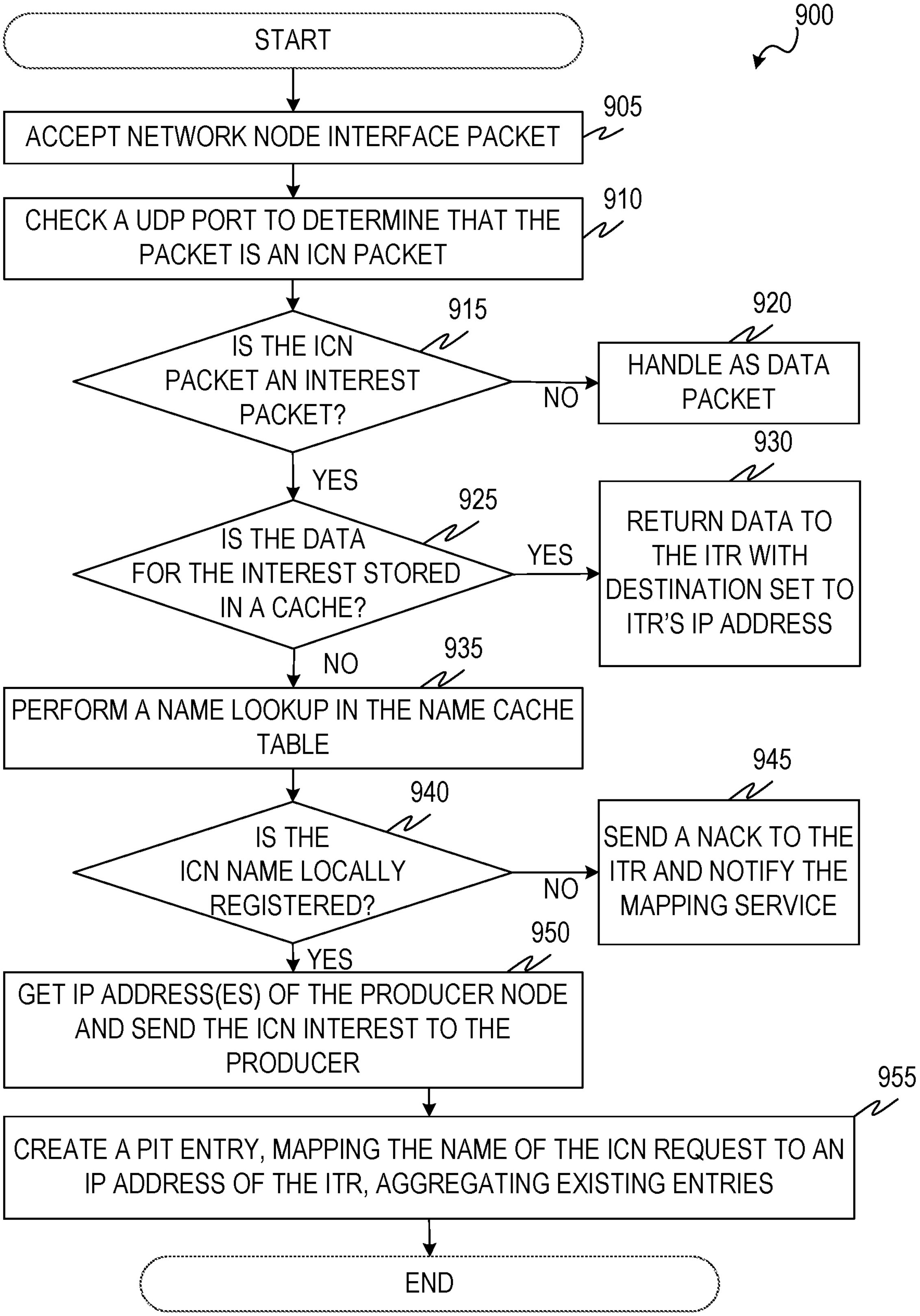
FIG. 9 is a flowchart illustration of a method of providing ICN over LISP, according to an example embodiment.

FIG. 9 is a flowchart illustration of a method of providing ICN over LISP, according to an example embodiment. The method 900 includes operations 905, 910, 915, 920, 925, 930, 935, 940, 945, 950, and 955. By way of example and not limitation, the method 900 is described as being performed by elements of the network topology 200, described above with respect to FIG. 2 and the computer 700, described above with respect to FIG. 7.

In operation 905, the egress module 765 of the ETR 220A accepts a network node interface (NNI) packet. An NNI packet is a data packet received via a network-facing interface. For example, an ETR connected via a UNI to a first network with a first endpoint may be connected via an NNI to a second network that includes an ITR connected to a second endpoint via a third network.

In operation 910, the egress module 765 determines if the NNI packet is an ICN packet by checking a UDP port value of the NNI packet. For example, a database table may contain records for LISP services and their corresponding UDP ports. If the UDP port of the NNI packet matches a port of a LISP service, the egress module 765 may determine that the NNI packet is an ICN packet. If the NNI packet is not an ICN packet, the method 900 terminates and the NNI packet is treated as an ordinary LISP packet instead of an ICN packet. If the NNI packet is a LISP-encapsulated ICN packet, the egress module 765 extracts the ICN packet from the encapsulating LISP packet.

In operation 915, the egress module 765 determines if the ICN packet is an interest packet. For example, the egress module 765 may examine a header of the ICN packet to determine if the message type of the ICN packet indicates that the ICN packet is an interest packet. If the ICN packet is not an ICN interest packet, then in operation 920, the egress module 765 provides the ICN packet to operation 1150 of the method 1100 for processing as a data packet and the method 900 terminates. However, if the ICN packet is an ICN interest packet, the method 900 continues with operation 925.

In operation 925, the egress module 765 identifies the interest of the ICN interest packet (e.g., from an ICN interest message field of the ICN interest packet) and determines, via the cache module 775, if data for the interest is available in the cache. If the data is available in the cache, the cache module 775 retrieves the cached data and the egress module 765 provides, in operation 930, the data in a LISP data packet that encapsulates an ICN data packet that includes the cached data. The LISP data packet is sent to the IP address from which the ICN interest packet was received (e.g., the IP address of the ITR associated with the endpoint that sent the ICN interest packet). Provision of the ICN data packet to the ITR terminates the method 900. If the data is not available in the cache, the method 900 continues with operation 935.

In operation 935, the egress module 765 performs a name lookup for the name of the interest in a name cache table, using the cache module 775. If the interest name is not locally registered (determined in operation 940), then, in operation 945, the egress module 765 sends a negative acknowledgement (NACK) response to the ITR and sends a notification to the mapping server (e.g., the map server 250). The notification to the mapping server informs the mapping server that the interest cannot be resolved by this ETR. The mapping server may respond to the notification by deleting an entry from a map table that indicated that the ETR was able to provide data for the interest, forward the notification to a map resolver (e.g., the map resolver 240), or both. The notification terminates the method 900.

If a map exists for the name in the cache table and the map indicates that the name is locally registered with the ETR (operation 940), the egress module 765 gets one or more IP addresses of the registered producer node and sends the ICN interest packet to the producer (operation 950).

In operation 955, the egress module 765 creates a local PIT entry that maps the name of the interest to the ITR IP address, aggregating existing entries. By use of the PIT, the ETR will be able to forward a later-received ICN data packet that satisfies the interest to the ITR corresponding to the ICN consumer that requested it.

Figure 10:
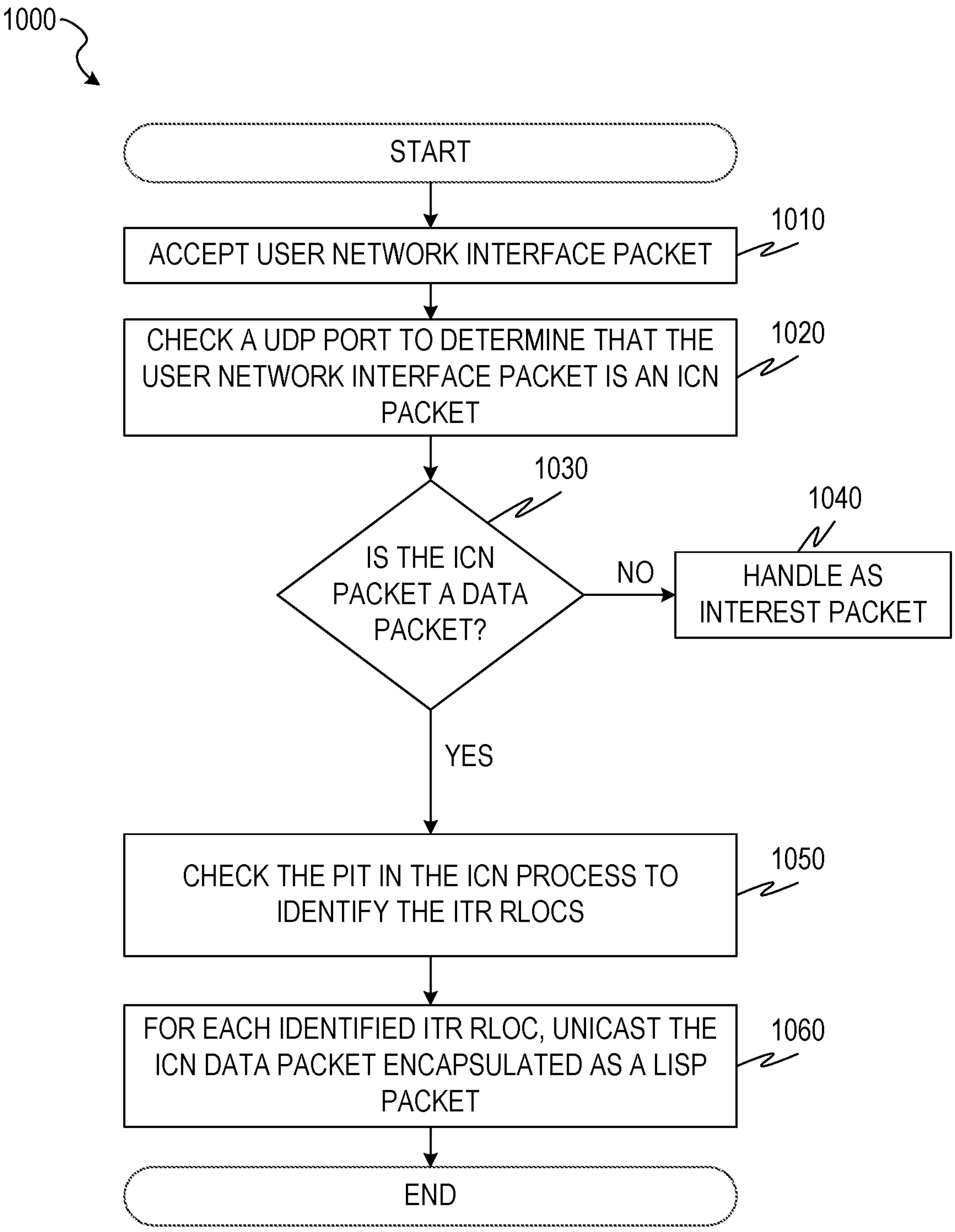
FIG. 10 is a flowchart illustration of a method of providing ICN over LISP, according to an example embodiment.

FIG. 10 is a flowchart illustration of a method 1000 of providing ICN over LISP, according to an example embodiment. The method 1000 includes operations 1010, 1020, 1030, 1040, 1050, and 1060. By way of example and not limitation, the method 1000 is described as being performed by the computer 700, described above with respect to FIG. 7.

In operation 1010, the egress module 765 of an ETR accepts a UNI packet. In operation 1020, the egress module 765 determines if the UNI packet is an ICN packet by checking a UDP port value of the UNI packet. If the UNI packet is not an ICN packet, the UNI packet is treated as a standard LISP packet and the method 1000 terminates.

In operation 1030, the egress module 765 determines if the ICN packet is an ICN data packet. For example, the egress module 765 may examine a header of the ICN packet to determine if the message type of the ICN packet indicates that the ICN packet is a data packet. If the ICN packet is not a data packet, in operation 1040, the ICN packet is transferred to operation 825 of the method 800 for processing as an interest packet and the method 1000 terminates. Otherwise, the method 1000 proceeds with operation 1050.

In operation 1050, the egress module 765 checks the PIT to identify the ITR RLOCs associated with the interest of the data packet. In this way, the locators (e.g., IP addresses) of any ITRs that requested data responsive to the interest are identified.

In operation 1060, the egress module 765 encapsulates the ICN data packet as a LISP packet and unicasts the LISP packet to each of the identified ITR RLOCs.

Figure 11:
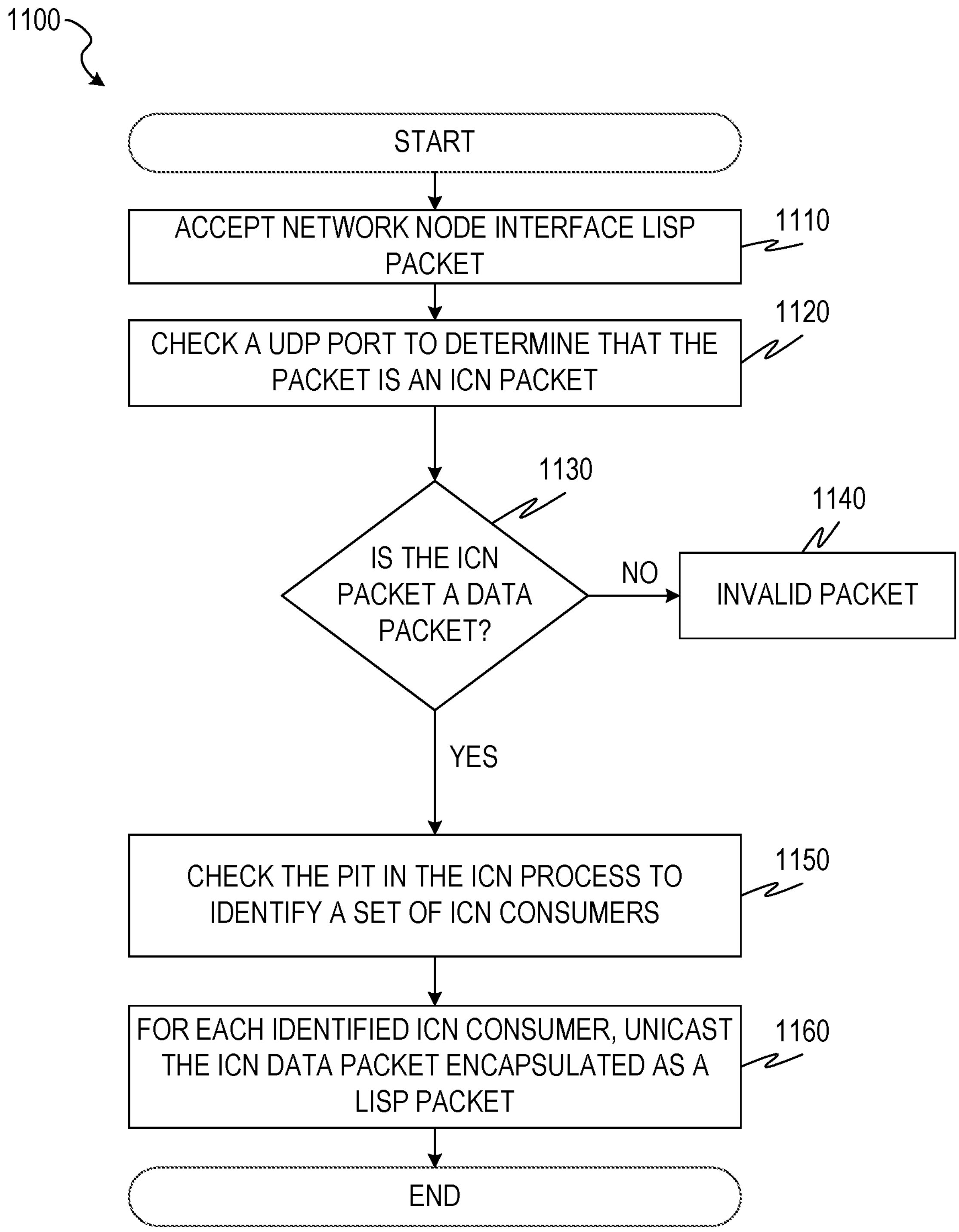
FIG. 11 is a flowchart illustration of a method of providing ICN over LISP, according to an example embodiment.

FIG. 11 is a flowchart illustration of a method 1100 of providing ICN over LISP, according to an example embodiment. The method 1100 includes operations 1110, 1120, 1130, 1140, 1150, and 1160. By way of example and not limitation, the method 1100 is described as being performed by elements of the network topology 100, described above with respect to FIG. 1, and the computer 700, described above with respect to FIG. 7.

In operation 1110, the ingress module 760 accepts an NNI LISP packet. For example, the ingress module 760 of the ITR 130A may receive an NNI packet addressed to an IP address of the ITR 130A from the router 140A. In operation 1120, the ingress module 760 determines if the NNI packet is an ICN packet by checking a UDP port value of the NNI packet. If the NNI packet is not an ICN packet, the NNI packet is treated as a standard LISP packet and the method 1100 terminates.

In operation 1130, the ingress module 760 determines if the ICN packet is an ICN data packet. If the ICN packet is not a data packet, in operation 1140, the ICN packet is recognized as an invalid packet, since ICN packets received at an ITR via an NNI cannot be interest packets. In this event, the method 1100 terminates. Otherwise, the method 1100 proceeds with operation 1150.

In operation 1150, the ingress module 760 checks the PIT to identify a set of ICN consumers associated with the interest of the data packet. In this way, the locators (e.g., IP addresses) of any endpoints that requested data responsive to the interest are identified.

In operation 1160, the ingress module 760 encapsulates the ICN data packet as a LISP packet and unicasts the LISP packet to each of the identified ICN consumers (e.g., the ICN endpoint 110A).

Figure 12:
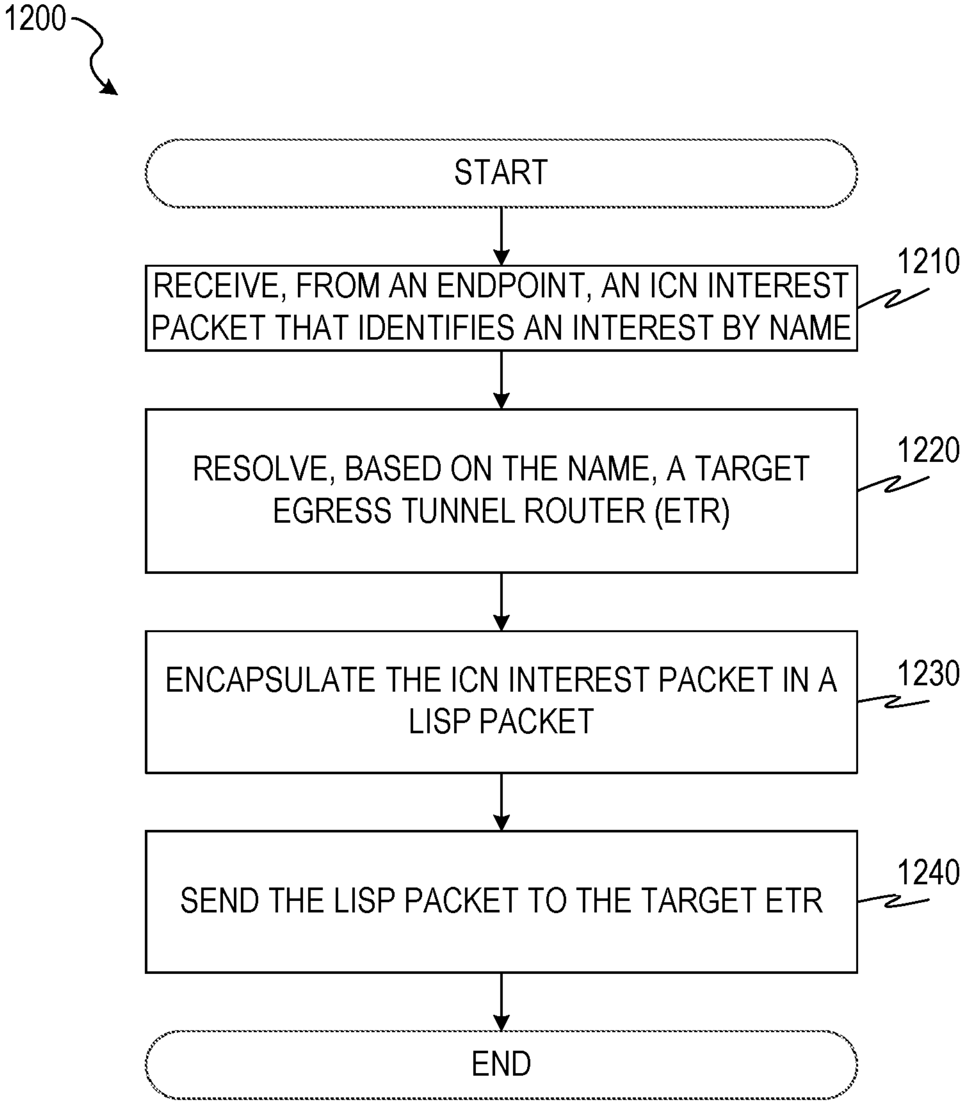
FIG. 12 is a flowchart illustration of a method of providing ICN over LISP, according to an example embodiment.

FIG. 12 is a flowchart illustration of a method 1200 of providing ICN over LISP, according to an example embodiment. The method 1200 includes operations 1210, 1220, 1230, and 1240. By way of example and not limitation, the method 1200 is described as being performed by elements of the network topology 100, described above with respect to FIG. 1, the network topology 400, described above with respect to FIG. 4, and the computer 700, described above with respect to FIG. 7.

In operation 1210, the ingress module 760 receives, from an endpoint, an ICN interest packet that identifies an interest by name. For example, the ingress module 760 of the ITR 425 may receive an ICN interest packet from the ICN consumer application 410 that identifies a named interest for which the ICN endpoint 405 requests data.

In operation 1220, the resolver module 770 resolves a target ETR in accordance with the name identified by the ICN interest packet. For example, the ICN producer application 440 may have registered a set of interests that it can satisfy with the ETR 430. The ETR 430 may have registered the set of interests with the resolver 455 as being accessible via the ETR 430. Accordingly, the ITR 425 may send a request to the resolver 455 for a locator for the interest. The resolver 455 may respond to the request with a locator (e.g., an IP address) for the ETR 430.

In operation 1230, the ingress module 760 encapsulates the ICN interest packet in a LISP packet. In operation 1240, the ingress module 760 sends the LISP packet to the target ETR. Thus, the ITR 425 acts as an interface between the ICN endpoint 405 (reached via an ICN network) and the ETR 430 (reached via a LISP network).

Figure 13:
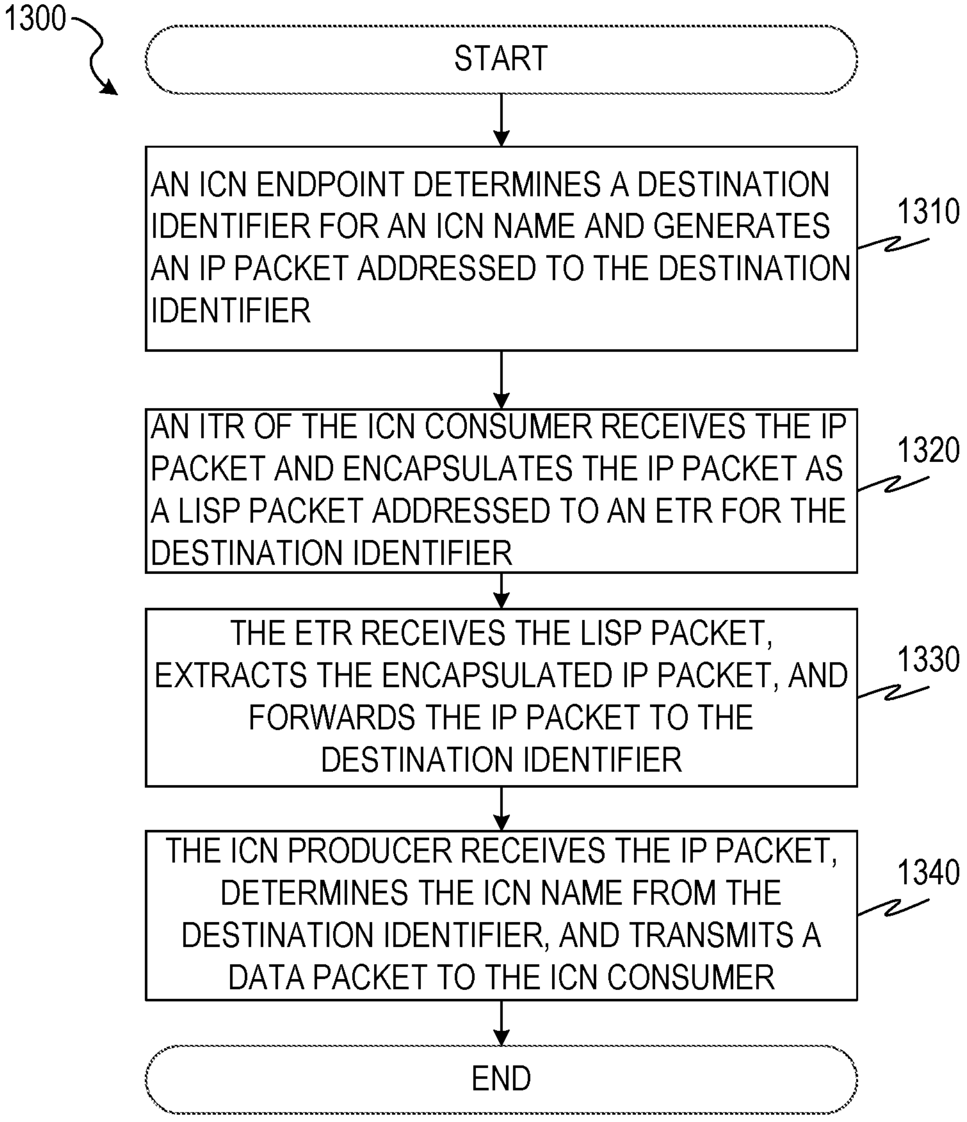
FIG. 13 is a flowchart illustration of a method of providing ICN over LISP, according to an example embodiment.

FIG. 13 is a flowchart illustration of a method 1300 of providing ICN over LISP, according to an example embodiment. The method 1300 includes operations 1310, 1320, 1330, and 1340. By way of example and not limitation, the method 1300 is described as being performed by elements of the network topology 100, described above with respect to FIG. 1, and the computer 700, described above with respect to FIG. 7. The example embodiment of FIG. 13 makes no change to the LISP network. In this example embodiment, the ICN hosts are modified to conduct name translation. Name-based routing is supported via LISP's control plane. The ITRs and ETRs perform no ICN-specific functions.

In operation 1310, an ICN endpoint performs a lookup or computation to determine a destination identifier for a named interest. For example, an ICN consumer application may create an ICN interest packet that includes a name for requested data. The ICN consumer application may send the ICN interest packet to a local ICN forwarder, which determines that the next hop to the ICN producer for the name is a LISP interface. The ICN forwarder may use a hash function to generate a 128-bit value from the name. The 128-bit value may be constructed from two separate 64-bit values, a first 64-bit value generated from a prefix portion of the name and a second 64-bit value generated from a segment of the name. The 128-bit value may be treated as an IPv6 address. The ICN endpoint creates an IP packet addressed to the determined IPv6 address and sends it to an ITR of the ICN consumer for routing.

In operation 1320, the ITR receives the IP packet, encapsulates it as a LISP packet, does name resolution, maps to the RLOC (e.g., the RLOC of an ETR for the destination identifier), and unicasts it. Since the destination address of the IP packet is an IPv6 address (and not an ICN name), the LISP map server does not need to support ICN names.

In operation 1330, the ETR corresponding to the RLOC receives the LISP packet and extracts the encapsulated IP packet addressed to the IPv6 address generated from the ICN name of the requested content. The ETR sends the IP packet to the ICN producer using the IPv6 address.

In operation 1340, the ICN producer receives the IP packet, performs a reverse lookup to identify the ICN name from the 128-bit hash value, and transmits one or more data packets to the ICN consumer using the IP address of the ICN consumer. The ETR of the ICN producer encapsulates the data packets as LISP data packets, which traverse the LISP network without requiring modification to the ITRs, the ETRs, or the LISP map server.

Devices and methods disclosed herein may reduce time, processor cycles, and power consumed in transmitting ICN data and interest packets over a LISP network. For example, centralizing ICN/LISP conversion logic in ITRs and ETRs may reduce processing power required by ICN producers and consumers. Additionally, features may be enabled through the use of devices and methods disclosed herein that are not previously known in the art, for example, interconnection of ICN islands (one or more ICN hosts connected via ICN) over LISP.

Although several embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Functionality of components described above can be further consolidated into a lesser number of components, or further distributed to other components. Other embodiments may be within the scope of the following claims.

What is claimed is:

1. A computer-implemented method of enabling information-centric networking (ICN) over a locator/identifier separation protocol (LISP), comprising:

receiving, by one or more processors of an ingress tunnel router (ITR), a data packet from an endpoint, the data packet comprising a user datagram port (UDP) port value;

determining, by the one or more processors of the ITR and based on the UDP port value of the data packet matching a UDP port value of a LISP service, that the data packet is an ICN packet;

determining, by the one or more processors of the ITR based on the ICN packet, that the ICN packet is an ICN interest packet that identifies an interest by name;

resolving, by the one or more processors of the ITR, a target egress tunnel router (ETR) in accordance with the name;

encapsulating, by the one or more processors of the ITR, the ICN interest packet in a LISP packet; and sending, by the one or more processors of the ITR, the LISP packet to the target ETR.

2. The computer-implemented method of claim 1, wherein the resolving of the target ETR in accordance with the name comprises:

sending a request to a LISP database, the request including the name.

3. The computer-implemented method of claim 2, wherein the resolving of the target ETR in accordance with the name further comprises:

receiving a response to the request, the response identifying the target ETR; and storing, at the ITR, a mapping between the name and the target ETR.

4. The computer-implemented method of claim 1, wherein:

the encapsulating of the ICN interest packet in the LISP packet comprises addressing the LISP packet to an Internet protocol (IP) address of the target ETR.

5. The computer-implemented method of claim 1, further comprising:

receiving, by the one or more processors of the ITR, a second LISP packet addressed to the ITR;

determining, by the one or more processors of the ITR, that the second LISP packet encapsulates an ICN data packet for the endpoint; and sending the ICN data packet to the endpoint.

6. The computer-implemented method of claim 5, wherein the method further comprises:

updating, by the one or more processors of the ITR, a pending interest table to map the name to the endpoint; and the determining that the second LISP packet encapsulates the ICN data packet for the endpoint comprises determining that encapsulation of the ICN data packet for the endpoint in accordance with the name and the pending interest table.

7. The computer-implemented method of claim 1, wherein:

the resolving of the target ETR in accordance with the name comprises resolving a plurality of ETRs including the target ETR; and the sending of the LISP packet to the target ETR is a step in a process of sending the LISP packet to each of the plurality of ETRs.

8. The computer-implemented method of claim 1, further comprising:

receiving, by one or more processors of a second ITR, an ICN data packet from a second endpoint, the ICN data packet including the name;

resolving, by the one or more processors of the second ITR, a second ETR in accordance with the name included in the ICN data packet;

encapsulating, by the one or more processors of the second ITR, the ICN data packet in a second LISP packet; and sending, by the one or more processors of the second ITR, the second LISP packet to the second ETR.

9. The computer-implemented method of claim 1, further comprising:

receiving, by one or more processors of the ETR, the LISP packet from the ITR;

extracting, by the one or more processors of the ETR, the ICN interest packet from the LISP packet;

identifying, by the one or more processors of the ETR, data from a content store in accordance with the name;

generating, by the one or more processors of the ETR, an ICN data packet with the data and the name;

resolving, by the one or more processors of the ETR, a second ETR in accordance with the name included in the ICN data packet;

encapsulating, by the one or more processors of the ETR, the ICN data packet in a second LISP packet; and sending, by the one or more processors of the ETR, the second LISP packet to the second ETR.

10. A router configured to enable information-centric networking (ICN) over a locator/identifier separation protocol (LISP) comprising:

a memory storage comprising instructions; and one or more processors in communication with the memory storage, wherein the one or more processors execute the instructions to perform:

receiving, from an endpoint, a data packet that comprises a user datagram port (UDP) port value;

determining, based on the UDP port value of the data packet matching a UDP port value of a LISP service, that the data packet is an ICN packet;

determining, based on the ICN packet, that the ICN packet is an ICN interest packet that identifies an interest by name;

resolving a target egress tunnel router (ETR) in accordance with the name;

encapsulating the ICN interest packet in a LISP packet; and sending the LISP packet to the target ETR.

11. The router of claim 10, wherein the resolving of the target ETR in accordance with the name comprises:

sending a request to a LISP database, the request including the interest name.

12. The router of claim 11, wherein the resolving of the target ETR in accordance with the name further comprises:

receiving a response to the request, the response identifying the target ETR; and storing a mapping between the name and the target ETR.

13. The router of claim 10, wherein:

the encapsulating of the ICN interest packet in the LISP packet comprises addressing the LISP packet to an Internet protocol (IP) address of the target ETR.

14. The router of claim 10, wherein the one or more processors further perform:

receiving a second LISP packet addressed to the router;

determining whether the second LISP packet encapsulates an ICN data packet for the endpoint; and in instances where the second LISP packet encapsulates the ICN data packet for the endpoint, sending the ICN data packet to the endpoint.

15. The router of claim 14, wherein:

the one or more processors further perform updating a pending interest table to map the name to the endpoint; and the determining that the second LISP packet encapsulates the ICN data packet for the endpoint comprises determining that the LISP packet encapsulates the ICN data packet in accordance with the name and an entry in the pending interest table.

16. The router of claim 10, wherein:

the resolving of the target ETR in accordance with the name comprises resolving a plurality of ETRs including the target ETR; and the sending of the LISP packet to the target ETR is a step in a process of sending the LISP packet to each of the plurality of ETRs.

17. The router of claim 10, wherein the one or more processors further perform:

receiving, from a second endpoint, an ICN data packet that includes the name;

resolving a second ETR in accordance with the name included in the ICN data packet;

encapsulating the ICN data packet in a second LISP packet; and sending the second LISP packet to the second ETR.

18. A non-transitory computer-readable medium storing computer instructions for enabling information-centric networking (ICN) over a locator/identifier separation protocol (LISP), that when executed by one or more processors, cause the one or more processors to perform steps of:

receiving, from an endpoint, a data packet, the data packet comprising a user datagram port (UDP) port value;

determining, based on the UDP port value of the data packet matching a UDP port value of a LISP service, that the data packet is an ICN packet;

determining, based on the ICN packet, that the ICN packet is an ICN interest packet that identifies an interest by name;

resolving a target egress tunnel router (ETR) in accordance with the name;

encapsulating the ICN interest packet in a LISP packet; and sending the LISP packet to the target ETR.

19. The non-transitory computer-readable medium of claim 18, wherein the resolving of the target ETR in accordance with the name comprises:

sending a request to a LISP database, the request including the name.

20. The non-transitory computer-readable medium of claim 19, wherein the resolving of the target ETR in accordance with the name comprises:

receiving a response to the request, the response identifying the target ETR; and storing a mapping between the name and the target ETR.

* * * * *